Figure 1:
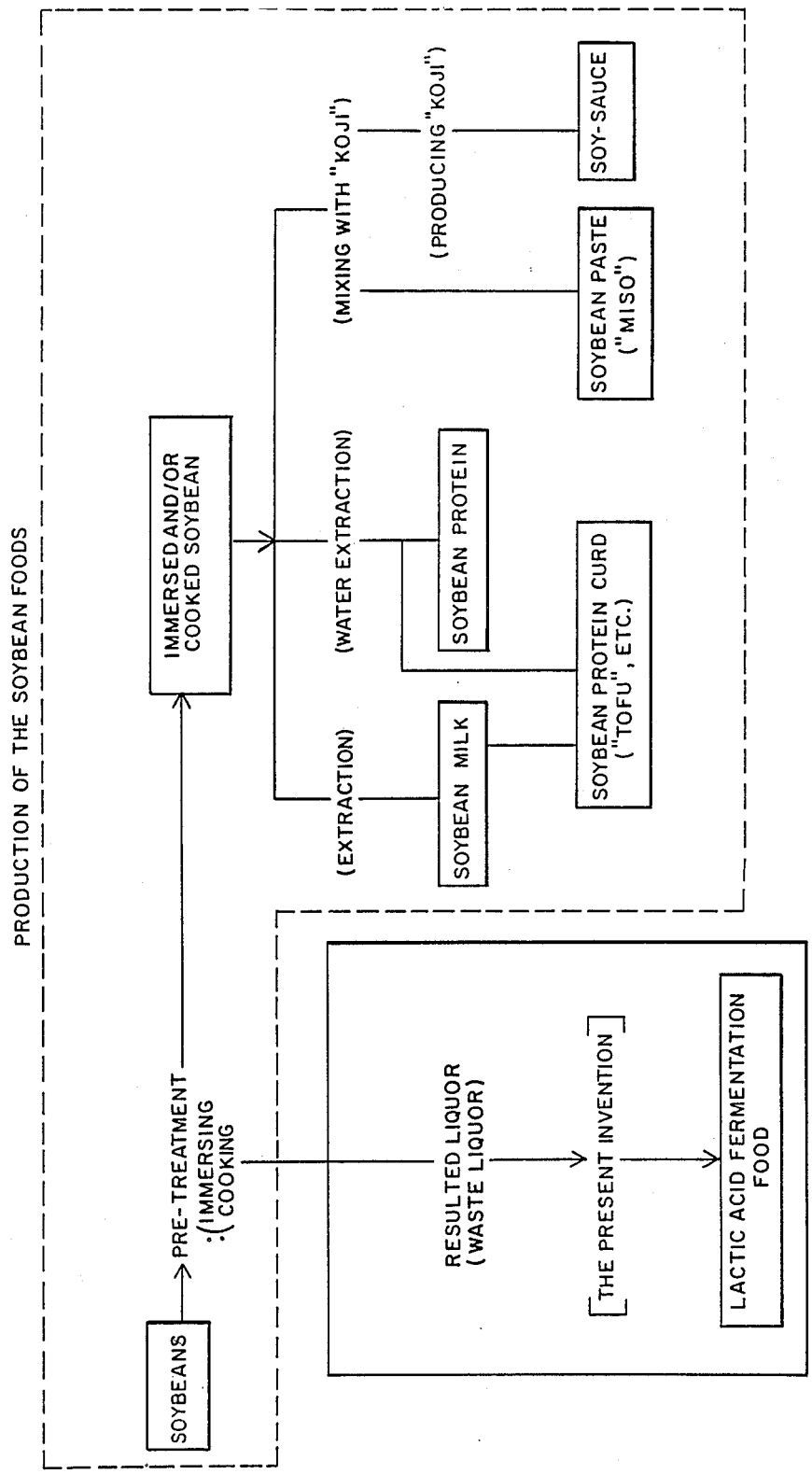

United States Patent [19]
Oka

[11] Patent Number: 4,816,267
[45] Date of Patent: Mar. 28, 1989

[54] PROCESS FOR THE PRODUCTION OF A NUTRITIONAL LACTIC ACID FERMENTATION PRODUCT

[75] Inventor: Hideki Oka, Ueda, Japan

[73] Assignee: Nagano Miso Kabushiki Kaisha, Ueda, Japan

[21] Appl. No.: 874,875

[22] Filed: Jun. 16, 1986

Related U.S. Application Data

[63] Continuation-in-part of Ser. No. 667,285, Nov. 1, 1984, abandoned.

[30] Foreign Application Priority Data

Nov. 21, 1983 [JP] Japan ................................ 58-218944

[51] Int. Cl.$^4$ ............................ A23J 1/14; A23L 2/00
[52] U.S. Cl. ........................................ 426/46; 426/52; 426/431; 426/598; 426/634; 426/655
[58] Field of Search ................... 426/7, 10, 46, 49, 52, 426/598, 634

[56] References Cited

U.S. PATENT DOCUMENTS

| 1,359,633 | 11/1920 | Thévenot | 426/598 X |
| 3,096,177 | 7/1963 | Ariyama | 426/46 |
| 3,891,771 | 6/1975 | Green et al. | 426/49 X |
| 3,944,676 | 3/1976 | Fridman et al. | 426/46 |
| 4,056,637 | 11/1977 | Hagiwara et al. | 426/52 |
| 4,303,678 | 12/1981 | Ogasa et al. | 426/46 |

FOREIGN PATENT DOCUMENTS

| 14772 | 7/1969 | Japan . | |
| 46-260 | 1/1971 | Japan | 426/46 |
| 34154 | 8/1972 | Japan | 426/49 |
| 48-14059 | 5/1973 | Japan | 426/46 |
| 61660 | 8/1973 | Japan . | |
| 77060 | 10/1973 | Japan . | |
| 58-56618 | 12/1983 | Japan | 426/46 |
| 0056618 | 12/1983 | Japan | 426/46 |
| 0006844 | 1/1984 | Japan | 426/46 |
| 1356363 | 6/1974 | United Kingdom | 426/46 |

OTHER PUBLICATIONS

"Yoghurt Production by Lactobacillus Fermentation of Soybean Milk", H. Kanda, et al., Process Biochemistry, May 1976, pp. 23–26.

Markley, K. S., "Soybeans and Soybean Products", vol. 1, Interscience Publ. Inc., N.Y., 1950, pp. 152, 153.

Primary Examiner—Donald E. Czaja
Assistant Examiner—Celine T. Callahan
Attorney, Agent, or Firm—Frishauf, Holtz, Goodman & Woodward

[57] ABSTRACT

A process for the production of a nutritional lactic acid fermentation product comprising admixing a lactobacillus with the waste liquor obtained by soaking soybeans in water and then removing the soybeans, said waste liquor containing very low protein content and containing sugar, and then fermenting said waste liquor containing said lactobacillus whereby said nutritional lactic acid fermentation product is obtained.

15 Claims, 3 Drawing Sheets

RESULTS OF DETERMINATION OF THE NUTRITIONS

| | WASTE LIQUOR | SOYBEAN MILK |
|---|---|---|
| Energy | 16 Kcal | 46 Kcal |
| Water | 95.7 g | 90.8 g |
| Protein | 0.8 g | 3.6 g |
| Fat | 0.2 g | 2.0 g |
| Sugar | 2.8 g | 2.9 g |
| Fiber | 0.0 g | 0.2 g |
| Ash | 0.5 g | 0.5 g |
| Phosphorus | 36.1 mg | 49.0 mg |
| Calcium | 6.9 mg | 15.0 mg |
| Iron | 0.9 mg | 1.2 mg |
| Sodium | 2.2 mg | 2.0 mg |
| Potassium | 263.0 mg | 90.0 mg |
| Thiamin | 0.06 mg | 0.03 mg |
| Riboflavin | 0.07 mg | 0.02 mg |

*Fig. 2*

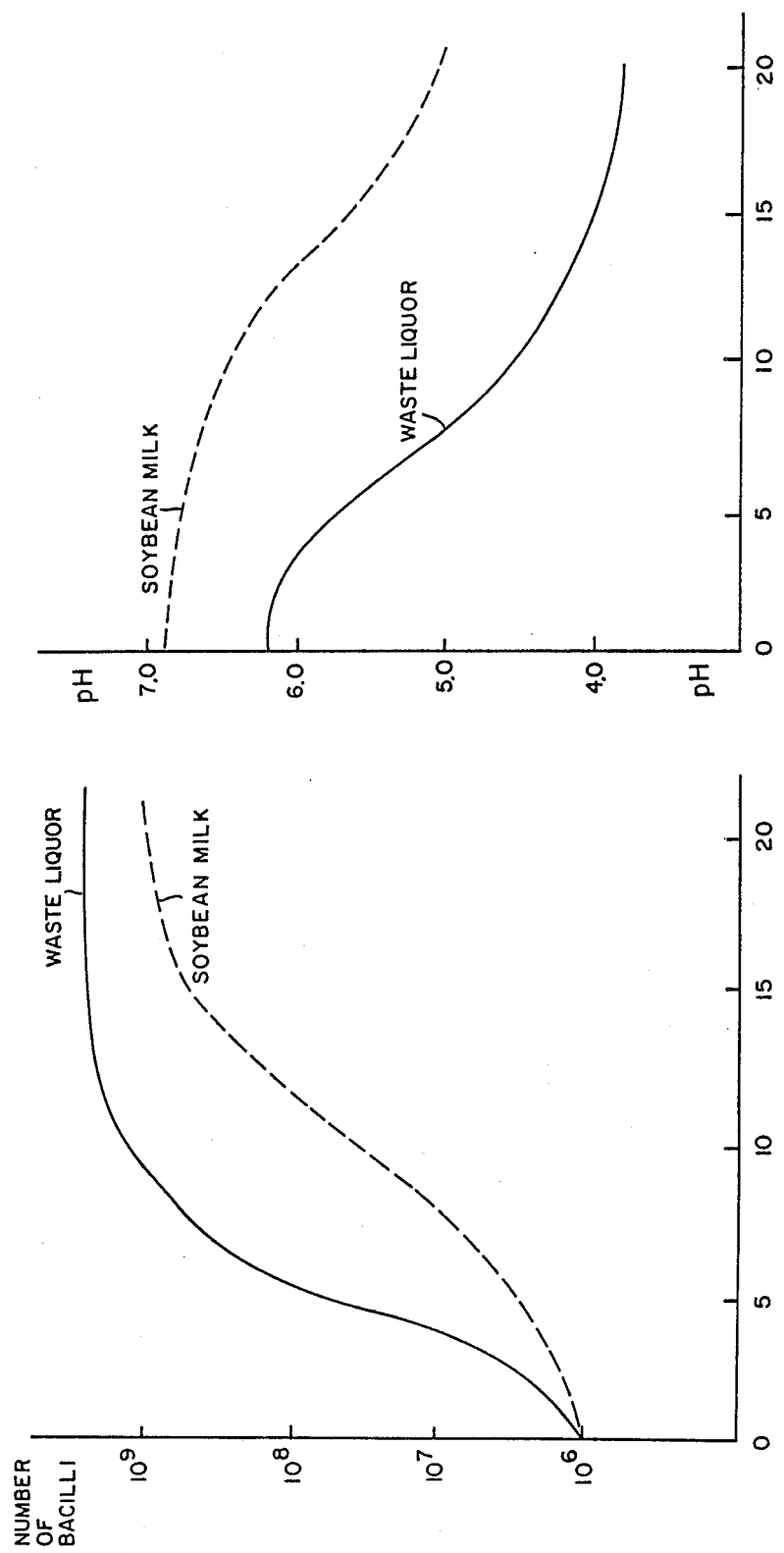

PROCESS FOR THE PRODUCTION OF A NUTRITIONAL LACTIC ACID FERMENTATION PRODUCT

This application is a continuation-in-part of application Ser. No. 667,285, filed Nov. 1, 1984 now abandoned.

DETAILED EXPLANATION OF INVENTION

The present invention relates to a process for the production of a lactic acid-fermentation food utilizing, as the raw material, a waste liquor resulted from the cooling or immersing procedure in the production of soybean foods, said waste liquor being heretofore discarded.

Soybeans have long been known as a high protein source and processed into various high protein foods such as "miso" (:soybean paste), "tofu38 0 (:soybean protein curd), soybean milk, etc.

In the production of soybean foods, as a pre-treatment to make soybeans absorb water and softened, soybeans are immersed in water and, if necessary, are further cooked in the immersion liquor or in a fresh water. For example, in the production of "miso" immersed and cooked soybeans are crushed, mixed with koji and fermented; and in the production of "tofu ", soybeans well absorbed water by immersion are finely ground and heated to extract a soybean milk and the protein and fat in the soybean milk are coagulated to obtain the final production.

Since soybean foods aim at high protein foods, the elution of protein from the material soybeans during the immersion and cooking steps in the pre-treatment should be minimized to the utmost. Therefore, the liquors resulted from the said immersion and cooking of soybeans contain so trace amount of protein as 0.8% or below and are discarded as a waste liquor of no utilization in the production of soybean foods.

However, the waste liquors have been pointed out to be an organic waste liquor which causes a serious pollution, and have imposed a great cost for their treatment upon manufacturers.

One object of the present invention is to provide a process for the production of a lactic acid-fermentation food having good flavor and characteristics by utilizing, as a raw material, a waste liquor trace in protein from the immersion and cooking of soybeans, which has been considered not only to be of no utilization in the production of spybean foods aiming at high protein foods, but also to be a source of serious pollution.

The present inventor has paid special attention to that while the waste liquor from the immersion and cooking of soybeans contains only a trace amount of protein and fat, it contains a sufficient amount of sugar for lactic acid fermentation, and have found that a lactic acid fermentation of the waste liquor after the addition of a lactic acid bacterium produces a lactic acid fermentation liquor having excellent flavor and characteristics.

More specifically, a waste liquor resulted from the immersion and cooking of soybeans as the pre-treatment of material soybeans in the production of soybean foods, is transferred into a fermenter, sterilized by heating and cooled under a sterilization condition. A lactic acid bacterium is inoculated as a starter to the waste liquor in an amount of $1 \times 10^4$ cells or more per 1 g of the waste liquor, and the mixture is left at 20°–50 °C. After 16–72 hours, the pH is well lowered and a favorable lactic acid fermentation liquor is obtained. Since the lactic acid fermentation is not accompanied with the coagulation of protein curd, no homogenation is required.

The fermentation liquor can be used as a lactic acid fermentation drink either directly or by adding, if necessary, appropriate flavors and sweetenning agents.

Further, the fermentation liquor can be used as a seasoning and still further, a various desired lactic acid fermentation foods, for example, a solid form food prepared by the addition of a hardening agent.

In below, Examples of the present invention are recited.

EXAMPLE 1

100 kg of de-shelled soybeans, which had been de-shelled up to 10 %, based on the original weight, by a sheller, were immersed one night in 300 L of water and soybeans were cooked with this immersion liquor at 120° C. for 20 minutes. 10 L of the waste liquor resulted from the immersion and cooking were transferred into a clean vessel and were cooled down to a temperature below 30° C. and thereto were added a lactic acid bacterium (Lactobacillus blugaricus) in an amount of $1 \times 10^5$ cells per 1 g of the said liquor, whereupon the mixture was left at 30° C. for 72 hours, whereby a lactic acid fermentation liquor was obtained.

Observations were carried out for pH-value, extract amount, total sugars, number of individual bacilli of the lactobacillus, amount of lac tic acid and so on together with organoleptic test for the lactic acid fermentation liquor, the results of which are recited in Table I.

EXAMPLE 2

100 kg of 10 %-de-shelled soybeans were immersed in 300 L of water over one night and the soybeans were then separated from the water and were cooked at 120° C. for 30 minutes in 200 L of fresh water. Thereafter, the procedures of Example 1 were repeated except that 10 L of the liquor from the cooking were employed. The observations and test same as in Example 1 were carried out, the results are recited also in Table I.

EXAMPLE 3

100 kg of 10 %-deshelled soybeans were cooked using 300 L of water at 120° C. for 20 minutes. Thereafter, the procedures of Example 1 were repeated except that 10 L of the waste liquor from the cooking were employed. The same observations and test as in Example 1 were carried out, the results of which are recited also in Table I.

EXAMPLE 4

100 kg of de-shelled soybeans, which had been de-shelled by a sheller up to 30 %, based on the original weight, were immersed overnight in 300 L of water. Then, the procedures of Example 1 were repeated except that 10 L of the said waste liquor were employed after this had been boiled at 120° C. for 20 minutes. The same observations and test as in Example 1 were carried out, the results of which are recited also in Table I.

EXAMPLE 5

The procedures of Example 1 were repeated except that 10 L of the waste liquor from the cooking in Example 1, to which 100 g of glucose were admixed uniformily, were employed. The same observations and test as in Example 1 were carried out, the results of which are recited also in Table I.

EXAMPLE 6

The procedures of Example 1 were repeated except that 10 L of the waste liquor from the cooking in Example 1, to which 800 g of sucrose were admixed uniformly, were employed. The same observations and test as in Example 1 were carried out, the results of which are recited also in Table I.

EXAMPLE 7

The procedures of Example 1 were repeated except that ordinary soybeans which were noto deshelled were employed in the place of 10 % -deshelled soybeans. The same observations and test as in Example 1 were carried out, the results of which are recited also in Table I.

EXAMPLE 8

The procedures of Example 1 were repeated except that a yeast was added in an amount of $5 \times 10^4$ cells per 1 g of the waste liquor resulted from cooking in Example 1. The same observations and test as in Example 1 were carried out, the results of which are recited also in Table I.

TABLE I

| | At start | | | | pH-Value after 24 Hours | After 72 hours | | | | |
|---|---|---|---|---|---|---|---|---|---|---|
| Example No. | pH-Value | Amount of Extract (%) | Total Sugar (%) | Number of Bacilli per gram | | pH-Value | Amount of Extract (%) | Total Sugar (%) | Amount of Lactic Acid (mg %) | Number of Bacilli per gram | Organoleptic Test |
| 1 | 6.18 | 6.0 | 2.1 | $9.3 \times 10^4$ | 4.65 | 4.21 | 5.5 | 1.6 | 570 | $6.6 \times 10^8$ | good |
| 2 | 6.02 | 6.2 | 2.5 | $8.2 \times 10^4$ | 4.58 | 4.11 | 5.8 | 1.9 | 650 | $5.7 \times 10^8$ | good |
| 3 | 6.06 | 5.0 | 2.0 | $1.1 \times 10^5$ | 4.77 | 4.28 | 4.5 | 1.5 | 580 | $5.1 \times 10^8$ | good |
| 4 | 6.60 | 6.8 | 2.5 | $1.2 \times 10^5$ | 4.80 | 4.43 | 6.5 | 2.1 | 490 | $4.9 \times 10^8$ | good |
| 5 | 6.20 | — | 3.0 | $9.2 \times 10^4$ | 4.73 | 3.86 | — | 2.2 | 940 | $9.2 \times 10^8$ | excell. |
| 6 | 6.28 | — | 9.3 | $1.0 \times 10^5$ | 4.70 | 4.25 | — | 9.0 | 580 | $6.1 \times 10^8$ | good |
| 7 | 6.24 | 3.6 | 1.4 | $8.8 \times 10^4$ | 4.70 | 4.33 | 3.4 | 1.1 | 450 | $3.2 \times 10^8$ | good |
| 8 | 6.23 | 5.9 | 2.2 | $9.2 \times 10^4$ | 4.70 | 4.25 | 5.5 | 1.5 | 540 | $4.8 \times 10^8$ | excell. |

Note: Analysis for the total nitrogen showed a value of 0.2–0.3% for all Examples.

The waste liquor, employed and used as the raw material in Examples, is same as that from the immersion and cooking as the pre-treatment in the production of soy-bean foods.

As shown in Table I, the waste liquor from the immersion and cooking, which is used as the raw material in the examples has a pH 6.0–6.2 and a sugar concentration of 2.8 weight % or more, both being preferable for the growth of lactic acid bacteria, and, therefore, the adjustment of pH and / or the concentration treatment are not particularly required. Moreover, since protein are contained in very trace amounts, the microbiological activities of the lactic acid bacteria are not inhibited and an active and stable lactic acid fermentation can be achieved.

From the stand point of taste, the obtained lactic acid fermentation liquor shows very preferable properties that it has an excellent sour and delicious taste, and the bitter taste and the unpleasant soybean smell specific to the immersion and cooling liquors are substantially eliminated. The reason is presumed to be that the immersion and cooking liquors contain only a trace amount of protein and, consequently, show originally a weak soybean smell, and the unpleasant smell is eliminated by the vigorous activities of lactic acid bacteria. Moreover, it is also noted that the grassy-smelling originated from aldehydes are mitigated by the treatment at a high temperature (115°–120° C.) in the cooking step to result a waste liquor and the sterilization step.

In Example 5, glucose was added to the waste liquor. Here, it was observed that the activity of a lactic acid bacteria became more prosperous and the pH value after 72 hours had reached to 3.86 and the amount of lactic acid produced was detected to be 940 mg-%.

In Example 6, the influence of addition of sucrose on the fermentation and the sweetness of the product were investigated by adding sucrose before the fermentation. It was found that the fermentation was not hindered and the fermentation liquor had a better taste with higher sweetness. By the way, it is of course possible to add other taste-modifying substances, flavors and so on before the fermentation.

When, as shown in Example 9, a yeast was added together with the lactic acid bacterium, the yeast was brought into activity after the pH value had been decreased and thus caused to produce alchohol which may have contributed to the impronement of savour and taste of the fermentation liquor. While the yeast was added in Example 9 at the same time with the addition of the lactic acid bacterium, it is of course possible also to add the yeast after the pH-value has been lowered after the addition of the lactic acid bacterium.

EXAMPLE 9

The procedures of Example 1 with a fermentation temperature of 30° C. were repeated.

Observations were carried out for pH-value, extract amount, number of individual bodies of the lactobacillus, amount of lactic acid and so on together with organoleptic test for the lactic acid fermentation liquor, the results of which are recited in Table II.

EXAMPLE 10

The procedures of Example 1 were repeated except that the fermentation temperature was settled at 20° C. The same observations and test as in Example 9 were carried out, the results of which are recited also in Table II.

EXAMPLE 11

The procedures of Example 1 were repeated except that the fermentation temperature was settled at 40° C. The same observations and test as in Example 9 were carried out, the results of which are recited also in Table II.

EXAMPLE 12

The procedures of Example 1 were repeated except that Streptococcus lactis was employed in the place of Lactobacillus blugaricus in Example 1. The same observations and test as in Example 9 were carried out, the results of which are recited also in Table II.

EXAMPLE 13

The procedure of Example 1 were repeated except that the amount of addition of the lactic acid bacteria was altered to $1 \times 10^3$ cells per 1 g of the waste liquor. The same observations and test as in Example 9 were carried out, the results of which are recited also in Table II.

EXAMPLE 14

The procedures of Example 1 were repeated except that the amount of addition of the lactic acid bacteria was altered to $1 \times 10^6$ cells per 1 g of the waste liquor. The same observations and test as in Example 9 were carried out, the results of which are recited also in Table II.

EXAMPLE 15

The procedures of Example 1 were repeated except that a concentrate of the waste liquor prepared by thickening 10 L Of the waste liquor of Example 1 into 3 L by evapolation was employed. The same observations and test as in Example 9 were carried out, the results of which are recited also in Table II.

EXAMPLE 16

The procedures of Example 1 were repeated except that the amount of addition of the lactic acid bacteria was altered to $1 \times 10^4$ cells per 1 g of the waste liquor. The same observations and test as in Example 9 were carried out, the results of which are recited also in Table II.

EXAMPLE 17

The procedures of Example 1 were repeated except that Lactobacillus plantarum was employed in the place of Lactobacillus blugaricus in Example 1 and the fermentation temperature was settled at 40° C. The same observations and test as in Example 9 were carried out, the results of which are recited also in Table II.

From table II, it is seen that, so far as the comparison of Examples 9, 10, 11 indicates, the activity of the lactic acid bacteria is sufficient even if the fermentation temperature is different (here, 40° C. was found to be at the most favorable).

In Examples 13, 14 and 16, experiments were carried out using varying amount of addition of a lactic acid bacteria. The fermentation liquor obtained in Example 13 was not favorable owing to the contamination by other microorganisms due to the small amount of addition of the acid bacteria as low as $1 \times 10^3$. In Example 14, a sufficient fermentation was achieved. In Example 16, the fermentation liquor was favorable, though a little decrease in pH-value and some delay of the requisite time for fermentation.

In Example 15, the experiment was carried out under the use of the concentrated waste liquor. Here, a favorable fermentation liquor without bitter taste was obtained, which showed some viscous consistency and in which the formation of lactic acid was also satisfactory.

When Lactobacillus plantarum is employed, the pH is well lowered in a short period of time (16–18 hours). Even when other lactic acid bacteria such as Lactobacillus bulgaricus and Streptococcus lactis are employed, a preferable fermentation liquor is obtained as shown in the Table I and II. Therefore, the kind of lactic acid bacteria is not an essential question in the present invention. The fermentation period varies considerably depending upon the combination of bacteria strain and fermentation temperature, and, therefore, such conditions should appropriately be chosen considering the desired pH of the aimed food and the convenience in the commercial operation.

As the result of determination of the nutritions in the lactic acid fermentation liquor, it has been revealed that the liquor is of very low protein and low calorie and contains no cholesterol, while the liquor is rich in vitamins, potassium and phosphorus. This means that the lactic acid fermentation foods obtained by the process of the present invention have their own distinctive characteristics and marketability different from known and usual lactic acid fermentation foods and soybean foods characterized by a high protein content.

The process of the present invention utilizes the waste liquor obtained in the pre-treatment of soybeans wherein the soybeans are immersed (soaked) in water with or without heating (cooking). The relationship of this pre-treatment to the subsequent processing of the soy-beans is illustrated in FIG. 1. The waste liquor which is treated in the process of the present invention is very low in protein, e.g. it preferably contains less than about 1% protein and more preferably contains not more than about 0.8% protein. The waste liquor also is relatively low in calorie content and is very low in fat. It is rich in vitamins, potassium and phosphorus. FIG. 2 compares the content of an example of the waste liquor utilized in the process of the present invention with that of soybean milk. Percentages are by weight.

FIGS. 3 and 4 report comparative fermentation data for an example of a waste liquor and for soybean milk

TABLE II

| Example No. | At start | | | pH-value after 24 hours | After 72 hours | | | | |
|---|---|---|---|---|---|---|---|---|---|
| | pH-value | Amount of Extract (%) | Number of Bacilli per gram | | pH-value | Amount of Extract (%) | Amount of Lactic Acid (mg %) | Number of Bacilli per gram | Organoleptic Test |
| 9 | 6.22 | 5.9 | $8.9 \times 10^4$ | 4.71 | 4.25 | 5.5 | 580 | $7.1 \times 10^8$ | good |
| 10 | 6.20 | 6.0 | $1.2 \times 10^5$ | 4.88 | 4.54 | 5.5 | 480 | $4.9 \times 10^8$ | good |
| 11 | 6.21 | 6.0 | $9.8 \times 10^4$ | 4.62 | 4.21 | 5.6 | 620 | $6.8 \times 10^8$ | good |
| 12 | 6.25 | 6.1 | $9.5 \times 10^4$ | 4.66 | 4.28 | 5.8 | 550 | $2.4 \times 10^8$ | good |
| 13 | 6.21 | 6.0 | $1.3 \times 10^3$ | 4.98 | 4.71 | 5.6 | 210 | $7.3 \times 10^7$ | inferior |
| 14 | 6.20 | 5.9 | $9.6 \times 10^5$ | 4.58 | 4.22 | 5.5 | 590 | $5.9 \times 10^8$ | good |
| 15 | 6.21 | 15.2 | $9.1 \times 10^4$ | 4.70 | 4.18 | 14.6 | 630 | $6.3 \times 10^8$ | good |
| 16 | 6.23 | 6.0 | $1.1 \times 10^4$ | 4.80 | 4.48 | 5.5 | 480 | $3.8 \times 10^8$ | good |

| Example No. | At start | | | pH-value after 12 hours | pH-value after 16 hours | After 18 hours | | |
|---|---|---|---|---|---|---|---|---|
| | pH-value | Amount of Extract (%) | Number of Bacilli per gram | | | pH-value | Amount of Lactic Acid (mg %) | Number of Bacilli per gram | Organoleptic Test |
| 17 | 6.16 | 6.0 | $1.1 \times 10^5$ | 4.61 | 4.10 | 3.98 | 686 | $1.2 \times 10^9$ | excell. | using Lactobacillus plantarum at 40° C. The data establish that an active and stable fermentation is obtained with the waste liquor which contains very low amounts of protein and that the unpleasant bean smell which is characteristic of the waste liquors (obtained by soaking with or without heating soybeans) are substantially eliminated.

As to be understood from the foregoing, the present invention provides a way of utilization of the waste liquors from the immersion and cooking of soybeans as the pre-treatment in the production of known soybean foods, the said waste liquors being considered to be not only of no use but also a source of serious pollution, and thus, the present invention provides the eradication of the pollution and the elimination of the cost for treatment.

Further, the present invention provides lactic acid fermentation foods from a cheap material which have distinctive characteristics different from the known soybean foods and lactic acid fermentation foods.

It is possible to obtain nutriments and drinks based on lactic acid fermentation having every desired savour and taste by admixing adequate flavors, sweetening substances and so on to the fermentation nutriments thus produced by the process according to the present invention.

As describes above, it is able to obtain novel and favorable lactic acid fermentation nutriment products of vegetable nature which have excellent properties, by relatively simple procedures consisting of admixing a lactobacillus to a cooked or soaked liquor of vegetable containing glycide and subjecting it to fermentation.

Also in the point that wide variety of soaked and cooked liquors of various vegetables which contain glycide can be employed for the raw material, the process according to the present invention is simple, convenient and inexpensive, in addition to the capability of making use of soaked and cooked liquors of raw vegetables, which had hetherto been discarded as waste indispensable in the processing of vegetables and left as industrial pollutants. Therefore, by utilizing such cooked and soaked liquors wasted hertofore, it has now become possible to provide valuable lactic acid fermentation nutriment products in lower prices, together with the attainment of effective prevention and eleimination of the industrial pollution due to the wasted soaked and cooked liquors of raw vegetable materials in the food processing industry.

I claim:

1. A process for the production of a nutritional lactic acid fermentation product from soybean pretreatment waste liquor comprising
   admixing a lactobacillus with the soybean pretreatment waste liquor which results from the soybean pretreatment steps of soaking soybeans in water and then removing the soybeans from the resulting waste liquor containing less than about 1% by weight protein and containing sugar, and then
   fermenting said waste liquor containing said lactobacillus whereby said nutritional lactic acid fermentation product is obtained.

2. The process of claim 1 wherein said lactobacillus which is admixed with said waste liquor is in an amount of at least $1 \times 10^4$ bacillus bodies per one gram of said waste liquor.

3. The process of claim 1 wherein said fermentation is carried out at a temperature of from 20° to 50° C.

4. The process of claim 1 wherein yeast is added to said waste liquor before said fermentation.

5. The process of claim 1 wherein sugar is added to said waste liquor before said fermentation.

6. The process of claim 1 wherein said waste liquor was produced by soaking and heating soybeans in water.

7. The process of claim 1 wherein said waste liquor contains not more than about 0.8% by weight protein.

8. The process of claim 2 wherein said fermentation is carried out at a temperature of from 20° to 50° C.

9. The process of claim 8 wherein said waste liquor contains not more than about 0.8% by weight protein.

10. The process of claim 8 wherein said waste liquor was produced by soaking and heating soybeans in water.

11. The process of claim 9 wherein yeast is added to said waste liquor before said fermentation.

12. The process of claim 11 wherein said waste liquor was produced by soaking and heating soybeans in water.

13. The process of claim 9 wherein sugar is added to said waste liquor before said fermentation.

14. The process of claim 13 wherein said waste liquor was produced by soaking and heating soybeans in water.

15. The process of claim 9 wherein said waste liquor was produced by soaking and heating soybeans in water.

* * * * *

UNITED STATES PATENT AND TRADEMARK OFFICE
CERTIFICATE OF CORRECTION

PATENT NO. : 4,816,267
DATED : March 28, 1989
INVENTOR(S) : H. OKA

It is certified that error appears in the above-identified patent and that said Letters Patent is hereby corrected as shown below:

In the title page, under "FOREIGN PATENT DOCUMENTS", insert the following:

--46-00260 1/1971 Japan....426/46--
--47-34154 8/1972 Japan....426/49--.

Column 1, line 19. delete "38 0".

Column 1, line 37, replace "so" by --only a--.

Column 1, line 50, "spybean" should read --soybean--.

Column 4, line 16, "impronement" should read --improvement--.

Column 7, delete lines 21-48.

Signed and Sealed this

Thirty-first Day of March, 1992

Attest:

HARRY F. MANBECK, JR.

*Attesting Officer*     *Commissioner of Patents and Trademarks*